Aug. 31, 1965     H. C. SCHULZE     3,204,019
PROCESS FOR FORMING CEMENT AND ASBESTOS ARTICLES
Filed Nov. 15, 1962
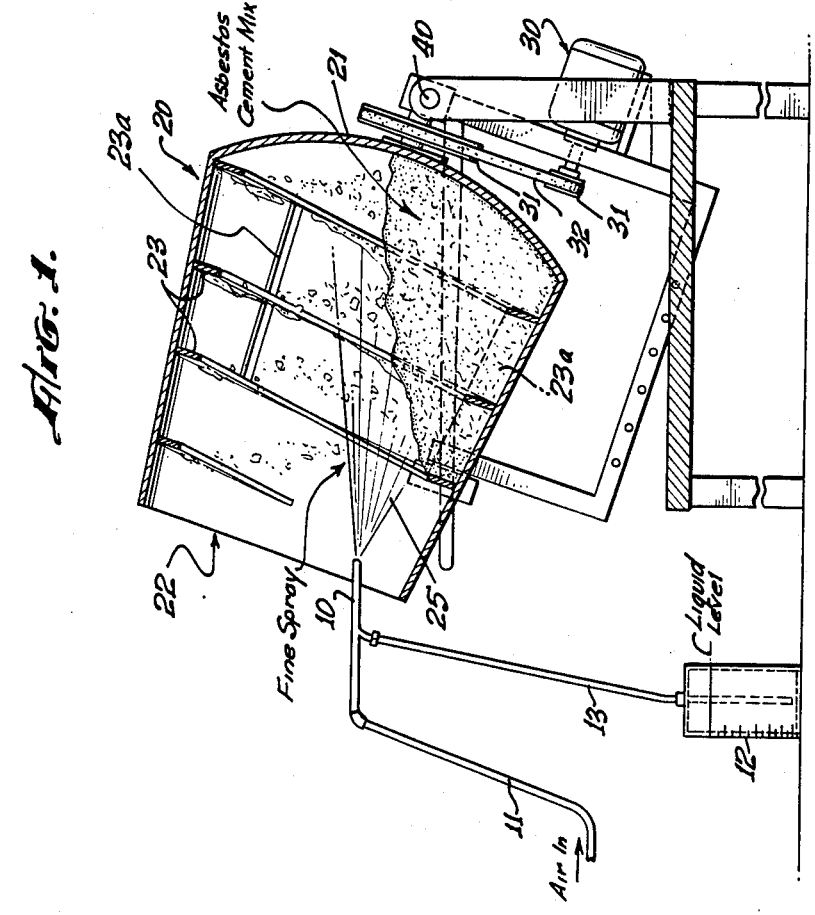
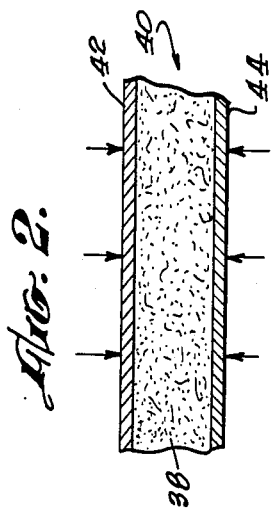
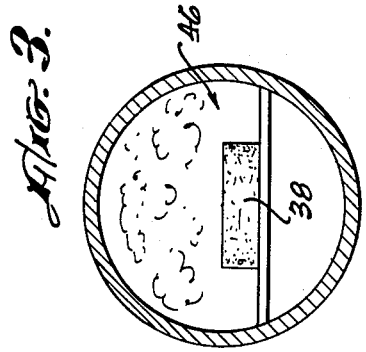
INVENTOR.
HERBERT C. SCHULZE,
BY
Fulwider, Patton, Rieber, Lee & Utecht
ATTORNEYS

United States Patent Office 3,204,019
Patented Aug. 31, 1965

3,204,019
PROCESS FOR FORMING CEMENT AND
ASBESTOS ARTICLES
Herbert C. Schulze, 3690 Highland Drive, Carlsbad, Calif.
Filed Nov. 15, 1962, Ser. No. 238,053
2 Claims. (Cl. 264—122)

This invention relates to a new and novel process for forming articles from particulate cement and asbestos fibers or similar materials.

For many years various tubular and sheet products have been formed of mixtures of Portland cement, asbestos fibers and water. Generally, such products are made by a process wherein a thin slurry of cement and fibers having a great excess of water as compared to the amount necessary to insure proper hydration of the cement is directed onto a rotating screen or the like. The slurry is transferred by contact from the screen to a moving felt belt. The felt belt moves the slurry into a vacuum zone wherein most of the excess water is removed from the slurry. Thereafter, the de-watered slurry is formed into a desired shape by the application of mechanical force, with such application of force removing additional excess water. A basic disadvantage of this process is the necessity of providing an expensive, comparatively massive plant. Additionally, the process itself is expensive since approximately 20 to 50 times as much water must be utilized during the process as is found in the final product and the cost inherent to removing such excess water is appreciable.

Another process utilized to form products of asbestos fibers and Portland cement includes mixing particulate cement and fibers dry, placing the same in a pressure mold, spraying water onto the mixed dry material and finally compressing this material. This process is not satisfactory since the water is not uniformly distributed in this manner through the mixed dry material, the water being blocked in its passage at the outer portion of such material whereby such water is not adequately distributed through the entire body of the material.

Still another heretofore proposed process incorporates mixing particulate cement and asbestos fibers with excess water to form a paste-like mixture. This wet mixture is then formed into the desired shape by spatula, trowel or the like. It is not practical to compress and work this wet mixture sufficiently to obtain maximum density in the final product. Accordingly, the strength of the final product is limited.

I have discovered a new and unique process of forming a product from particulate cement, asbestos fibers and water in which the mixture remains in a loose particulate and non-cohesive mass until actually formed into a desired shape.

More particularly, my new process utilizes tumbling dry cement with dry asbestos fibers while introducing a fine spray of water into the tumbling materials. The water is introduced in measured amounts until the originally dry materials have been uniformly moistened to the desired degree, i.e. sufficient water is added to insure proper hydration of the cement. Thereafter, the material is subjected to forming operations without the necessity of water removal or addition.

It is a major object of this invention to provide a process of forming articles of cement, asbestos fibers and water wherein the exact amounts of each material are mixed together prior to forming. Thereafter, the mixed material is compressed to impart the desired shape of the article. The material is then cured.

An additional object of the invention is to provide a process of the aforedescribed nature which is much less expensive than heretofore proposed processes of this type.

It is another object of this invention to provide a process of the aforedescribed nature which results in products having superior qualities of appearance and dimensional integrity.

Yet a further object of the invention is to provide a process of the aforedescribed nature which results in a product having maximum characteristics of strength.

The foregoing and other objects and advantages of this invention will be clear to those skilled in the art when reading the following specification in conjunction with the attached drawing in which:

FIGURE 1 is a side view in central vertical section showing a device for spraying water in controlled amounts onto a tumbling mass of cement and asbestos fibers in accordance with the process of my invention;

FIGURE 2 is a diagrammatic showing of the compressing or shaping step of said process; and FIGURE 3 is a diagrammatic showing of the curing step of said process.

The term "cement" as used herein applies not only to Portland cement, but also includes a material comprising Portland cement and one or more additives, as for example silica flour, diatomite, clay, talc or volcanic ash. Also, the term "water" as used herein shall be taken to include water plus various chemicals such as silicate of soda, calcium chloride and the like.

Referring to the drawings and particularly FIGURE 1 thereof, my process utilizes a spraying device, such as a conventional paint spray gun or the like 10 connected with a suitable source of pressurized air connected through a tube 11 and a source of water 12 connected through a second tube 13. The spray gun 10 sprays water into a tumbling device, such as a conventional cement mixer comprising an open-ended drum 20 in generally cylindrical shape, preferably somewhat larger at one end than the other, the larger end generally being enclosed by a more or less spherical end piece 21 and the smaller end being formed with an opening 22 for receiving and discharging materials relative to the drum.

Inside of the drum 20 are formed flights 23 and/or ribs 23a which are generally complete or partial spiral strips fastened at various places within the drum so that as the drum revolves the material within will be moved backward and forward by means of the spirally inclined flights and will also be carried part way around the drum and directionally upward each drum revolution and thereafter dropped freely, such material returning to the lower portion of the drum as water 25 is sprayed thereon through spray gun 10.

A suitable motor 30 with pulleys 31 and belt 32 is provided to accomplish rotation of the drum 20. The drum is mounted in customary manner whereby it may be pivoted at point 40 so as to drop the wetted cement-asbestos material out of the opening 22 by operation of gravity after the proper amount of water has been added to this material.

It is important to the operation of my process that the proper quantity of water be added to the cement and asbestos fibers to insure proper hydration of the cement. An excessive amount of water causes too wet a mixture and water must be removed. On the other hand, the addition of insufficient water for proper hydration of the cement results in a material which will not adhere when compacted or otherwise shaped and which will not set up properly.

By the use of my process it is easy to spray a proper amount of water within close tolerances onto the dry cement-asbestos materials during the tumbling thereof within drum 20. As the initially dry material drops through the air repeatedly within the mixture, it comes in contact with the fine water spray in the center of the mixer and thus each individual particle is given a uniform, slight coating of water. The resultant mixture is a non-cohesive, particulate mass with just the proper amount of moisture dispersed to and remaining in and on all individual articles. This has not been accomplished by any other process known heretofore.

It should be noted that the term "non-cohesive, particulate mass" as used herein refers to the cement-asbestos material as being in such condition when it leaves the drum 20 that individual fibers or fiber strands, with cement particles fall loosely from contact with one another, maintain a general contact, if any, only through the tendency of the fibers to entangle one another, and not through a liquid or paste-like attraction. When in this condition, the cement-asbestos material is capable of being divided and weighed with extreme accuracy through a simple device such as a vibrator. Further, the exact amount of cement-asbestos material used to form the finished, uncured article is obtained without requiring removal of excess water or addition of water during, or after the material is shaped. Another advantage of providing a non-cohesive, particulate mass is that the cement-asbestos material, not being cohesive and remaining particulate, may be easily weighed in minute quantities and may be accurately and easily distributed to a shaping or molding surface.

The correct amount of water for effecting proper hydration of cement in the shaped article is known to those skilled in the art. Generally, the weights of cement, asbestos fibers and water in my process will be within the following approximate limits:

| | Percent |
|---|---|
| Asbestos | 5 to 30 |
| Cement | 45 to 75 |
| Water | 15 to 30 |

An excellent mixture for forming many products in accordance with my process is 10% asbestos fibers by weight, 20% water by weight, 45% cement by weight and 25% silica flour by weight.

Referring now to FIGURE 2, after the cement-asbestos materials have been tumbled and mixed as described, the non-cohesive, particulate mass 38 is transferred to a shaping zone 40 that includes forming surfaces 42 and 44. Mechanical force is then applied to one or both of the surfaces 42 and 44 to shape the mass 38 to a desired configuration.

Referring to FIGURE 3, the shaped material 38 is then removed from the shaping zone 40 and transferred to a curing zone 46. This curing zone 46 may take the form of an autoclave and the shaped material is exposed to steam in this autoclave under curing conditions well-known in the art, i.e. for 16 hours in 350° F. steam. It is usually preferable to let the shaped material air cure for approximately 16 hours before it is placed in the autoclave.

Other conventional curing practices may be utilized in place of that described hereinabove.

While the embodiment specifically described herein is fully capable of achieving the objects and advantages desired, many modifications will be clear to those skilled in the art without departing from the inventive concepts herein disclosed. It is not my intention to be restricted to the specific embodiments shown and described since the same are for illustrative purposes only.

I claim:

1. A process for forming an article from initially dry particulate cement material and asbestos fiber materials, that includes:

tumbling said initially dry materials together in a mixing zone while spraying water into said mixing zone, with said materials dropping freely through the air whereby each individual particle of said materials is given a coating of water to thereby produce a non-cohesive, particulate mass;

compressing said mass so as to increase the density thereof and configure said mass to the shape of said article;

and curing said configured mass.

2. The process as set forth in claim 1 wherein the weights of cement, asbestos fibers and water approximate 45%–75%, 5%–30% and 15%–30%, respectively.

References Cited by the Examiner

UNITED STATES PATENTS

| 2,008,074 | 7/35 | Isman | 264—312 |
| 2,285,497 | 6/42 | Cuno | 264—312 |

ROBERT F. WHITE, *Primary Examiner.*

ALEXANDER H. BRODMERKEL, *Examiner.*